April 2, 1963
H. H. NEEL
3,083,916
INFUSOR FOR LAWN AND GARDEN TREATMENT
Filed March 12, 1962
2 Sheets-Sheet 1
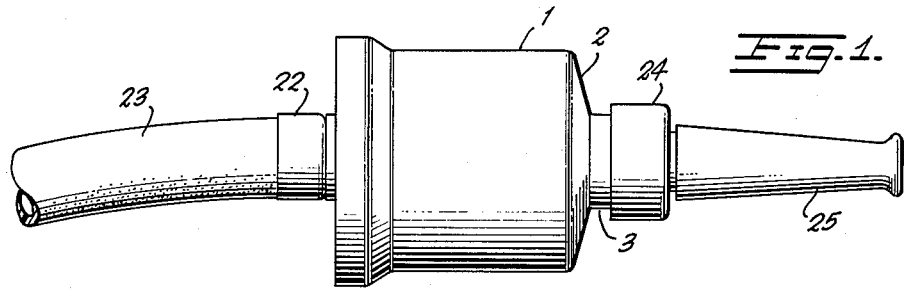
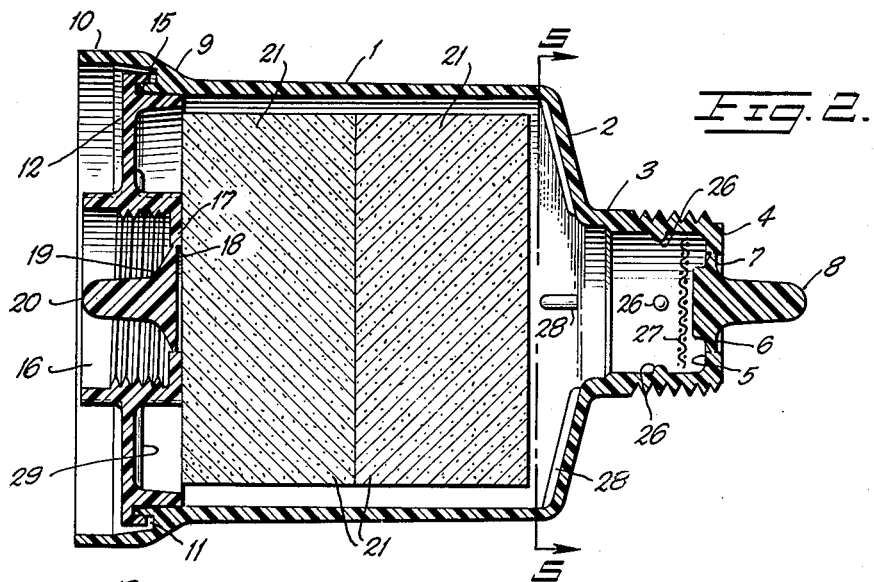
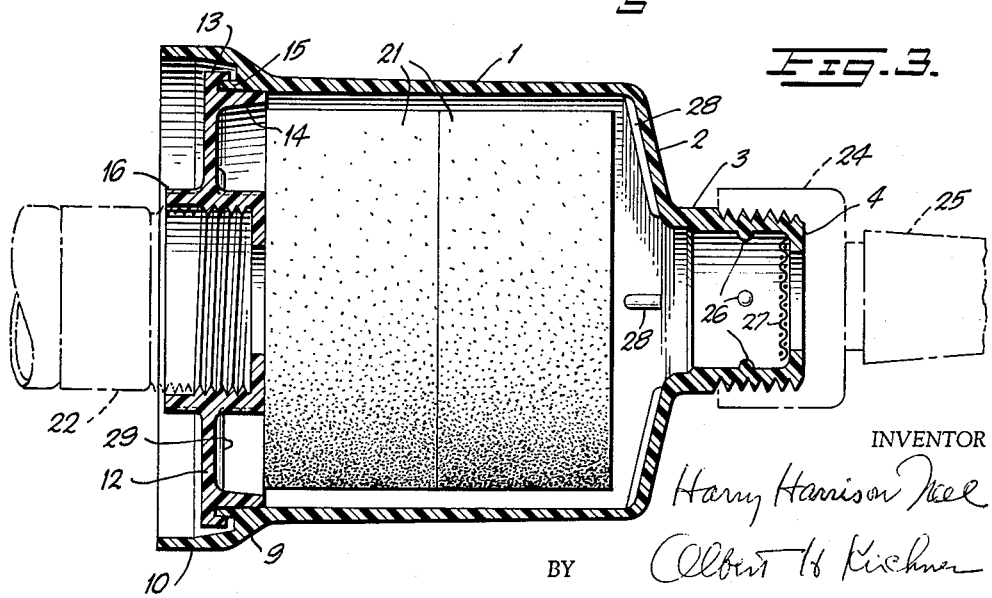
INVENTOR
Harry Harrison Neel
BY Albert H. Kirchner
ATTORNEY April 2, 1963
H. H. NEEL
3,083,916
INFUSOR FOR LAWN AND GARDEN TREATMENT
Filed March 12, 1962
2 Sheets-Sheet 2
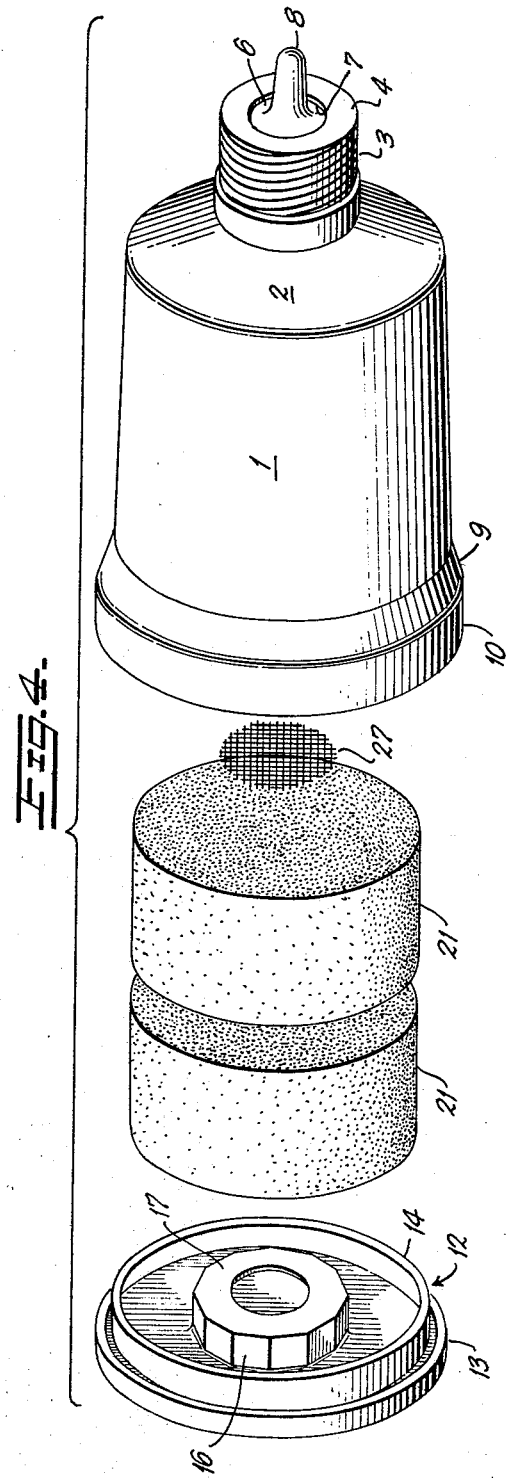
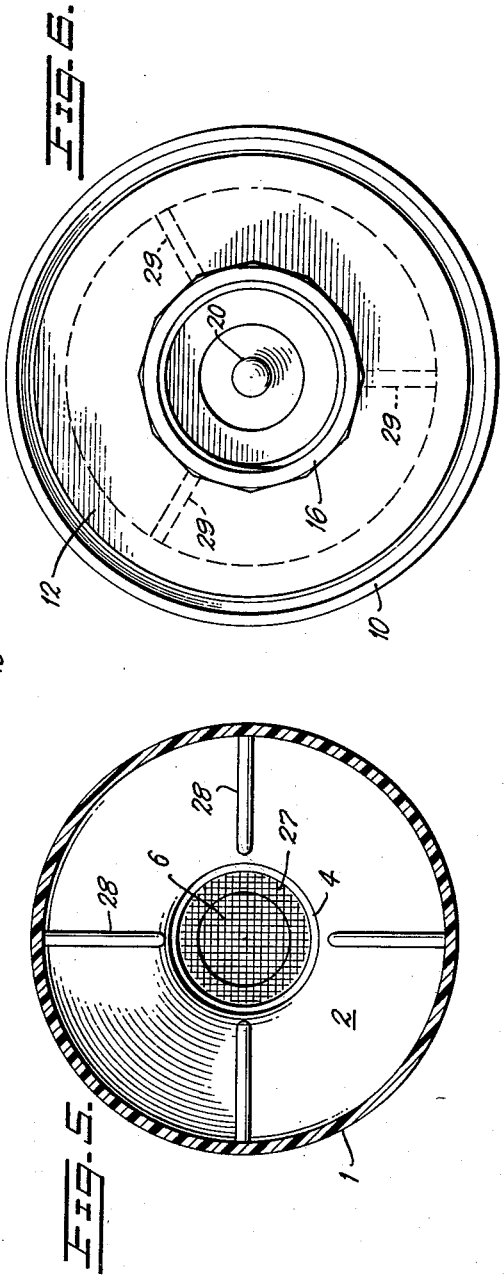
INVENTOR
Harry Harrison Neel
BY Albert H. Kirchner
ATTORNEY

United States Patent Office 3,083,916
Patented Apr. 2, 1963

3,083,916
INFUSOR FOR LAWN AND GARDEN TREATMENT
Harry Harrison Neel, Yeadon, Pa. (2540 S. 66th St., Philadelphia 42, Pa.); Ann P. Neel, administratrix of said Harry Harrison Neel, deceased
Filed Mar. 12, 1962, Ser. No. 178,941
7 Claims. (Cl. 239—315)

The present invention relates to infusors and more particularly to devices of the infusor type for use in the application of soil treatment water-soluble solids to lawns and gardens.

The device provided by the invention is of particular utility, although by no means is it necessarily thus limited, in the application of fertilizer, insecticides, weed and crabgrass killers, etc., to small lawns and gardens by householders and the like where the areasa to be treated and the quantities of materials to be used are small.

For this purpose the invention comprises a small container having enclosed therein one or more cakes of solid water-soluble treatment material, which may be a concentrated fertilizer composition of appropriately proportioned nitrogen, phosphate and potash compounds, or which may be any of the well known insecticides, weed and crabgrass killers or the like, and having nipples formed on its opposite ends so that the container can be interposed in a line of garden hose, as between the hose and the nozzle, for passage of a stream of water therethrough with resulting dissolving of the solid and spraying of the solution out through the nozzle onto the grass or other vegetation to be treated.

Devices of this general description are old in the art but the present invention adds certain features of utility that are new and advantageous, as will be pointed out hereinafter in this specification and will be made the subject of the appended claims.

Generally speaking, the novel features include principally the provision of a container body which may be very inexpensively made for single use and which therefore can be manufactured and sold to the ultimate consumer with the treatment material pre-installed in it and hermetically sealed so that the material will be well preserved against evaporation or sublimation and against softening, crumbling and deliquescence in humid atmosphere.

Another object is concerned with providing an infusor device of the character indicated which can be opened, i.e., have its seals broken and its end uncovered for insertion into a garden hose line, by a simple manual operation requiring no skill and no tool.

A further object is to provide an infusor device of this kind in which a built-in screen or strainer will insure retention of all the soluble cake material until it is dissolved, i.e., which will prevent the discharge of any undissolved particles which may become broken off from the cake body and entrained in the stream of water passing through the container body, and to mount such screen or strainer in the outlet end of the body by means molded in place therein.

Another and related object is to provide a molded body that can be made in two parts: a generally cylindrical cup shaped body into which the cake of material can be put by the manufacturer, and an end closure plate than can be applied thereafter by the manufacturer to seal the device and which will not require removal but will remain in place throughout the whole use of the infusor and be thereafter discarded with the emptied body of the device.

With the foregoing and other objects in view, most of which it is believed will be apparent to those skilled in the art as the following description proceeds, an embodiment of the invention which has been thoroughly tested in use and in commercial production and found to be entirely satisfactory and which is accordingly at present preferred is shown in the accompanying drawings, in which FIGURE 1 is a side elevational view of the infusor interposed in a conventional household garden hose, being coupled between the hose and nozzle;

FIG. 2 is a relatively enlarged axial cross sectional view taken through the infusor as produced by the manufacturer and bought by the ultimate consumer;

FIG. 3 is a similar view showing the infusor after its inlet and outlet ends have been opened and the device has been interposed in the garden hose line (indicated in broken lines);

FIG. 4 is an exploded perspective view of the parts of the infusor and its double cake of treatment material contents;

FIG. 5 is a transverse or radial cross sectional view taken on the line 5—5 of FIG. 2, looking toward the outlet end; and FIG. 6 is a bottom plan, or bottom end elevational, view of the unopened infusor shown in FIG. 2.

In these figures the reference numeral 1 designates the body portion of a container which, as shown, is generally cylindrical and cup-shaped, having at one end a steeply tapering frusto-conical terminal portion 2 merging into a nipple 3 which is externally threaded, and the extreme outer end of which is radially internally flanged as shown at 4 to provide the nipple with an inside shoulder 5.

The material of which the container is made is preferably a clear transparent plastic, such for example as molded polypropylene.

The nipple 3 has its outer end sealed and closed by a plug 6 which is integrated with the nipple structure by a thin circular zone or line 7 at the juncture of the plug and the flange 4. The center of the plug is formed with an internally thickened zone and an axially outwardly projecting solid tab 8 which, as will be seen, serves as a handle by which the plug may be broken about the line of weakness 7 and removed from the nipple. As cast or molded, however, the plug is integral with and sealed to the nipple 3.

The opposite end of the container body 1 is slightly enlarged by a flaring zone 9 which terminates in a cylindrical skirt 10 of sufficiently larger diameter than that of the body 1 to allow the inner surface of the body to be extended a short distance into the skirt and provide a relatively narrow channel 11 inside the skirt for making connection with a circular closure plate 12.

This closure plate 12 is made of the same material as the body 1 and has at its periphery a radially outer, axially inwardly directed circumferential short flange 13 and a radially inner, axially inwardly directed concentric longer flange 14, providing an intervening annular channel. The parts are so proportioned that this channel is complemental to the projecting circular rib 15 which forms a continuation of the inner surface of the body 1 and cooperates with the skirt 10 thereof to provide the body channel 11, and so that, when the plate 12 is seated on the end of the body 1 with the two channels interfitted, as shown in FIGS. 2 and 3, the flanges 13 and 14 of the plate will snugly contact the interposed body rib 15.

The central area of the closure plate 12 is formed with an internally threaded nipple 16 which projects axially about equally from both sides of the plate. The inner end of this nipple is radially internally flanged, as shown at 17, and integrated with this flange by a thin circular zone or line of weakness 18 is a thickened central plug 19 having an axially outwardly projecting handle tab 20. It will be recognized that the flange, plug, weakness line and handle tab arrangement is like the corresponding features of the nipple 3, so that the plug 19 can be broken out of the nipple 16 by sidewise or radial pressure on its tab 20, so as to open the nipple and hence this end of the container 1, assuming the container is sealed by the plate 12 being secured in the container end.

The container is sealed by installation of the closure plate 12 after a cylindrical block 21, or a pair of such blocks as shown in FIGS. 2 and 3, have been put into the container so as substantially to fill it to capacity.

The sealing is accomplished by spin-welding, i.e., the closure plate 12 is fitted into position with the channels of the plate and body in nested relation as shown in FIG. 2, and then, while the body 1 is held stationary, the closure plate is rapidly rotated until the heat of friction softens the rubbing surfaces of the two parts sufficiently to cause them to adhere in welded relation when rotation is stopped and the parts are allowed to cool in pressed together condition.

The material of the blocks or cakes 21, which of course is the fertilizer, insecticide, weed or crabgrass killer or the like heretofore described, is thus sealed hermetically inside the body of the device for permanent preservation until it is to be applied in use.

It is prepared for use by the simple expedient of knocking out the end plugs 6 and 19, which is readily accomplished by sidewise or radial pressure manually exerted against the handle tabs 8 and 20. The thus opened infusor is then coupled into the hose line by screwing the coupling 22 of the hose 23 into the inlet nipple 16 and by screwing the outlet nipple 3 into the inlet end 24 of a conventional spray nozzle 25.

It will be obvious, it is thought, that when the flow of water is properly established, as by adjustably opening the discharge orifice of the nozzle, the passage of water through the body of the container will dissolve the solid cake material so that the desired solution will be discharged from the nozzle.

In order to prevent issuance of particles of the material as the cakes become eroded by the water, which could result in clogging the nozzle and impairment of the spray pattern for which the nozzle was adjusted, as well as waste of the material by incomplete dissolution of it, it is desirable to include a screen or strainer in the outlet end of the body. This is conveniently and inexpensively accomplished by forming a series of circumferentially spaced integral embossments 26 on the inner wall of the outlet nipple 3 and interposing a circular disk 27 between them and the shoulder 5 at the outer end of the nipple.

It is desirable, particularly if the walls of the container be made relatively thin as a matter of economy in connection with the preferred single use feature of the infusor, to strengthen the structure by molding in it integral ribs like those shown at 28 in the tapering outlet end and at 29 in the closure plate 12.

The outwardly protruding end of the inlet nipple 16 may be contoured with a polygonal surface to facilitate connection with the chuck of the rotating means during the sealing operation.

Obviously the invention is not limited to the precise details and particular combination of features of the illustrated embodiment, and it is not indispensible that all of these details and features be used conjointly. Various other combinations and variations are contemplated within the spirit of the invention and the scope and purview of the appended claims.

I claim:

1. An infusor for use in soil treatment with soluble solids comprising a container of generally cylindrical shape having a cake of solid water-soluble soil treatment material therein and having its axially opposite ends permanently sealed by end closures having respectively an externally threaded and an internally threaded nipple, each nipple being closed by a knock-out plug having an axially outwardly projecting handle tab for facilitating rupture and removal of the plug.

2. An infusor for use in soil treatment with soluble solids comprising a container body of generally cylindrical cup shape made of molded plastic having a cake of solid water-soluble soil treatment material therein and having an outlet end portion containing an externally threaded axial nipple and an inlet end portion comprising a circular closure plate welded to the body of the container and having an internally threaded axial nipple, and a knockout plug removably closing each of said nipples, each of the knockout plugs being provided with an axially outwardly projecting handle tab for facilitating rupture of the plug from the nipple.

3. The infusor claimed in claim 2 in which the body is formed with a circumferential flange projecting in an axial direction from its inlet end and the circular closure plate is formed with a complemental circumferential groove receiving said flange and welded thereto.

4. The infusor claimed in claim 2 including a screen disk secured in the outlet nipple.

5. The infusor claimed in claim 2 in which the outlet nipple is formed with a radially inwardly projecting protuberance and a screen disk is mounted thereon.

6. The infusor claimed in claim 2 in which the outlet nipple is formed with a plurality of circumferentially spaced radially inwardly projecting embossments and a screen disk is mounted thereon.

7. The infusor claimed in claim 2 in which the outlet nipple is formed with a radially inwardly projecting end flange and a plurality of circumferentially spaced radially inwardly projecting embossments spaced axially inwardly from said end flange, with a screen disk mounted between said embossments and end flange.

References Cited in the file of this patent

UNITED STATES PATENTS

| | | |
|---|---|---|
| 1,225,713 | Houghton | May 8, 1917 |
| 1,806,025 | Seaman | May 19, 1931 |
| 1,899,222 | Werder | Feb. 28, 1933 |
| 2,412,728 | Goodhue | Dec. 17, 1946 |
| 2,420,223 | Brewer | May 6, 1947 |
| 2,814,528 | Blasczyk | Nov. 26, 1957 |